US012272322B2

United States Patent
Han et al.

(10) Patent No.: US 12,272,322 B2
(45) Date of Patent: Apr. 8, 2025

(54) DRIVE METHOD OF DISPLAY SYSTEM, DISPLAY SYSTEM AND ELECTRONIC DEVICE

(71) Applicant: BOE Technology Group Co., Ltd., Beijing (CN)

(72) Inventors: Nan Han, Beijing (CN); Wenhong Tian, Beijing (CN); Zijiao Xue, Beijing (CN); Zhiqiang Wang, Beijing (CN); Shuaishuai Xu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/268,300

(22) PCT Filed: Jun. 14, 2022

(86) PCT No.: PCT/CN2022/098590
§ 371 (c)(1),
(2) Date: Jun. 19, 2023

(87) PCT Pub. No.: WO2023/240431
PCT Pub. Date: Dec. 21, 2023

(65) Prior Publication Data
US 2024/0428744 A1    Dec. 26, 2024

(51) Int. Cl.
*G09G 3/34*    (2006.01)
*G06F 3/01*    (2006.01)
*G09G 3/36*    (2006.01)

(52) U.S. Cl.
CPC .......... *G09G 3/3426* (2013.01); *G06F 3/011* (2013.01); *G09G 3/3607* (2013.01)

(58) Field of Classification Search
CPC ........ G02F 1/133528; G02F 1/133541; G02F 1/134309; G02F 1/13306; G02F 1/133548;
(Continued)

(56) References Cited

U.S. PATENT DOCUMENTS

2005/0134547 A1*  6/2005  Wyatt ............... G09G 3/3406
                                                      345/102
2005/0237292 A1  10/2005  Kim et al.
(Continued)

FOREIGN PATENT DOCUMENTS

CN    203385936 U    1/2014
CN    203773160 U    8/2014
(Continued)

OTHER PUBLICATIONS

PCT/CN2022/098590 international search report.
PCT/CN2022/098590 Written Opinion.

*Primary Examiner* — Shaheda A Abdin
(74) *Attorney, Agent, or Firm* — IPro, PLLC

(57) ABSTRACT

The present disclosure relates to a drive method of a display system, a display system and an electronic device. The drive method includes: sending, by a controller, first drive signals to a display panel in sequence and sending, by the controller, second drive signals to a variable phase retarder in sequence, where first drive signals cause liquid crystals of each of the sub-display regions to deflect one by one, and the second drive signals cause sub-phase retarders to change state one by one; sending, by the controller, third drive signals to the display panel in sequence, where the third drive signals cause sub-backlight regions to turn on in sequence, and each of the sub-backlight regions turns on not earlier than the corresponding sub-phase retarder changes state, where the corresponding sub-phase retarder refers to a sub-phase retarder for accepting light emitted by the sub-display region corresponding to the sub-backlight region.

18 Claims, 6 Drawing Sheets

(58) Field of Classification Search
CPC .... G02F 3/041; G09G 3/2096; G09G 3/3406; G09G 2320/0646; G09G 2320/064; G09G 2320/0606; G09G 2354/00
See application file for complete search history.

(56) References Cited

U.S. PATENT DOCUMENTS

| | | | |
|---|---|---|---|
| 2014/0333875 A1* | 11/2014 | Cheng | G02F 1/13471 349/96 |
| 2015/0253487 A1* | 9/2015 | Nichol | G02B 6/0018 362/610 |
| 2015/0379961 A1* | 12/2015 | Masuyama | G09G 5/10 315/294 |
| 2016/0117978 A1* | 4/2016 | Shikata | G09G 3/2096 345/690 |
| 2019/0156766 A1 | 5/2019 | Lin et al. | |
| 2019/0318701 A1 | 10/2019 | Huang et al. | |
| 2023/0252949 A1 | 8/2023 | Lin et al. | |

FOREIGN PATENT DOCUMENTS

| | | | |
|---|---|---|---|
| CN | 107462997 A | | 12/2017 |
| CN | 109254410 A | | 1/2019 |
| CN | 109741712 A | | 5/2019 |
| CN | 209858911 U | | 12/2019 |
| CN | 113156693 A | | 7/2021 |
| CN | 113253458 A | | 8/2021 |
| CN | 113470588 A | | 10/2021 |
| CN | 113791497 A | | 12/2021 |
| CN | 114002869 A | * | 2/2022 |

* cited by examiner

DRIVE METHOD OF DISPLAY SYSTEM, DISPLAY SYSTEM AND ELECTRONIC DEVICE

CROSS-REFERENCE TO RELATED APPLICATIONS

This application is a national stage of international PCT Application No. PCT/CN2022/098590 filed on Jun. 14, 2022, the entire contents of which are incorporated herein by reference.

TECHNICAL FIELD

The present disclosure relates to the field of display technologies, and in particular to a drive method of a display system, a display system and an electronic device.

BACKGROUND

In the related arts, along with continuous development of technologies, the virtual reality devices are applied more and more widely. People put forward higher requirements for parameters such as refresh rate of the virtual reality devices and the resolution of the vergence-accommodation conflicts.

There are multiple solutions for the vergence-accommodation conflicts in the virtual reality devices, for example, a time division multiplexing solution of single screen and multiple focal planes is adopted. But, the time division multiplexing solution has a problem of near and far light field conflicts.

SUMMARY

The present disclosure provides a drive method of a display system, a display system and an electronic device, so as to address all or part of the shortcomings of the related arts.

According to a first aspect of embodiments of the present disclosure, there is provided a drive method of a display system. The display system includes a controller, a display panel and a variable phase retarder. The display panel includes liquid crystals and a backlight unit and has sub-display regions, where each of the sub-display regions includes pixel rows. The backlight unit has sub-backlight regions: where each of the sub-backlight regions corresponds to one of the sub-display regions. The sub-backlight regions are configured to turn on independently to provide backlight to the corresponding sub-display regions. The variable phase retarder accepts light emitted by the display panel and changes state controlled by the controller to selectively transmit a first polarized light or a second polarized light. The variable phase retarder includes sub-phase retarders, and each of the sub-phase retarders corresponds to and is configured to accept light emitted by one of the sub-display regions:

the drive method includes:
sending, by the controller, first drive signals to the display panel in sequence and sending, by the controller, second drive signals to the variable phase retarder in sequence, where the first drive signals cause the liquid crystals of each of the sub-display regions to deflect one by one, and the second drive signals cause the sub-phase retarders to change state one by one; and
sending, by the controller, third drive signals to the display panel in sequence, where the third drive signals cause the sub-backlight regions to turn on in sequence, and where each sub-backlight region turns on not earlier than the corresponding sub-phase retarder changes state, where the corresponding sub-phase retarder refers to a sub-phase retarder for accepting light emitted by the sub-display region corresponding to the sub-backlight region.

From the above embodiments, it can be known that, each of the sub-backlight regions turns on not earlier than the corresponding sub-phase retarder changes state, and the corresponding sub-phase retarder is a sub-phase retarder for accepting light emitted by the sub-display region corresponding to the sub-backlight region, and thus it can be guaranteed that the corresponding sub-phase retarder are not in a flip state when the sub-backlight region turns on. Hence, time sequences of the sub-phase retarders, the sub-backlight regions and the liquid crystals corresponding to the sub-backlight regions can be mutually matched so as to avoid the problem of conflicts of far field image and near field image. Furthermore, by using first drive signals, the liquid crystals of each of the sub-display regions are controlled to deflect one by one, so as to greatly shorten a time length that the first drive signals sequentially scan all pixel rows of the display panel. As a result, the problem that a time length in which a single first drive signal sequentially scans all pixel rows of the display panel exceeds a time length of one frame of image can be avoided. In this case, the display panel can achieve high refresh rate in a case of high pixel density while improving the overall image quality displayed by the display system.

In some embodiments, each of the sub-backlight regions turns off not later than the corresponding sub-phase retarder changes state again.

In some embodiments, a state change of the sub-phase retarders has a rising edge period and a falling edge period, and the sub-backlight region being on not temporally overlapping the rising edge period and the falling edge period of the corresponding sub-phase retarder.

In some embodiments, during a display process of one frame of image, a first of the first drive signals and a first of the second drive signals are sent simultaneously.

In some embodiments, the first of the first drive signals and the first of the second drive signals both are sent at an initial moment of starting to display one frame of image.

In some embodiments, in the second drive signals, a time interval between two adjacent second drive signals is an staggered time length $T_{stagger}$, and $T_{stagger}$ is not greater than a maximum staggered time length $T_{max.stagger}$ and not less than a minimum staggered time length $T_{min.stagger}$;

where the maximum staggered time length
$$T_{max.stagger}=T_1/(A-1):$$

where the minimum staggered time length $T_{min.stagger}=[A*T_2+(A-1)*T_3-T_4+T_1]/(A-1):$ where $T_1$ represents a time interval between an initial moment of one frame of image and a moment of sending a first of the third drive signals:
where A represents to a number of the sub-phase retarders:
where $T_2$ represents a time length in which one sub-backlight region keeps illuminating:
where $T_3$ represents a time interval between a moment that a previous sub-backlight region ends illuminating and a moment that a next sub-backlight region starts illuminating:
where $T_4$ represents a time length in which the display panel displays one frame of image.

In some embodiments, the display panel includes 8 sub-backlight regions having a total of 2880 pixel rows, a time required to scan each pixel row is 0.0027 milliseconds, the time length $T_4$ of one frame of image is 11.11 milliseconds, $T_1$ is 5.472 milliseconds, $T_2$ is one millisecond, $T_5$ is 2.094 milliseconds, $T_3$ is 0.127 milliseconds, and $T_{stagger}$ is 0.4644 milliseconds.

In some embodiments, the display system is configured to perform at least two display states alternately;
in a first display state, the variable phase retarder allows the first polarized light to be transmitted through, and the display system displays an image of a first focal plane; in a second display state, the variable phase retarder allows the second polarized light to be transmitted through, and the display system displays an image of a second focal plane.

In some embodiments, the display system further includes a reflective polarizer located at a light-emitting side of the variable phase retarder and configured to transmit the first polarized light and reflect the second polarized light.

In the first display state, the first polarized light transmitted through the variable phase retarder is transmitted through the reflective polarizer to form the image of the first focal plane: in the second display state, the second polarized light transmitted through the variable phase retarder is reflected between the reflective polarizer and the variable phase retarder and after being converted into the first polarized light, is transmitted through the reflective polarizer to form the image of the second focal plane, where in some embodiments, the sub-phase retarders include quarter liquid-crystal wave plates.

According to a second aspect of embodiments of the present disclosure, there is provided a display system, including a controller, a display panel and a variable phase retarder.

The display panel includes liquid crystals and a backlight unit and has sub-display regions: where each of the sub-display regions includes pixel rows: where the backlight unit has sub-backlight regions: where each of the sub-backlight regions corresponds to one of the sub-display regions; and the sub-backlight regions are configured to turn on independently to provide backlight to the corresponding sub-display regions: where the variable phase retarder accepts light emitted by the display panel and changes state controlled by the controller to selectively transmit a first polarized light or a second polarized light: where the variable phase retarder includes sub-phase retarders, and each of the sub-phase retarders corresponds to and is configured to accept light emitted by one of the sub-display regions.

The controller is configured to automatically perform the following operations, the operations include:
sending, by the controller, first drive signals to the display panel in sequence and sending, by the controller, second drive signals to the variable phase retarder in sequence, where the first drive signals cause the liquid crystals of each of the sub-display regions to deflect one by one, and the second drive signals cause the sub-phase retarders to change state one by one; and
sending, by the controller, third drive signals to the display panel in sequence, where the third drive signals cause the sub-backlight regions to turn on in sequence, and where each sub-backlight region turns on not earlier than the corresponding sub-phase retarder changes state, where the corresponding sub-phase retarder refers to a sub-phase retarder for accepting light emitted by the sub-display region corresponding to the sub-backlight region.

In some embodiments, each of the sub-backlight regions turns off not later than the corresponding sub-phase retarder changes state again.

In some embodiments, a state change of the sub-phase retarders has a rising edge period and a falling edge period, and the sub-backlight region being on not temporally overlapping the rising edge period and the falling edge period of the corresponding sub-phase retarder.

In some embodiments, the sub-phase retarders include quarter wave plates.

In some embodiments, during a display process of one frame of image, a first of the first drive signals and a first of the second drive signals are sent simultaneously.

In some embodiments, the first of the first drive signals and the first of the second drive signals both are sent at an initial moment of starting to display one frame of image.

According to a third aspect of the present disclosure, there is provided an electronic device, including the display system described in any one of the above items.

In some embodiments, the electronic device is a virtual reality device.

It should be understood that the above general descriptions and subsequent detailed descriptions are merely illustrative and explanatory rather than limiting of the present disclosure.

BRIEF DESCRIPTION OF THE DRAWINGS

The accompany drawings which are incorporated in and constitute a part of the specification illustrate embodiments consistent with the present disclosure and serve to explain the principle of the present disclosure together with the specification.

DETAILED DESCRIPTION OF THE EMBODIMENTS

Figure 1:
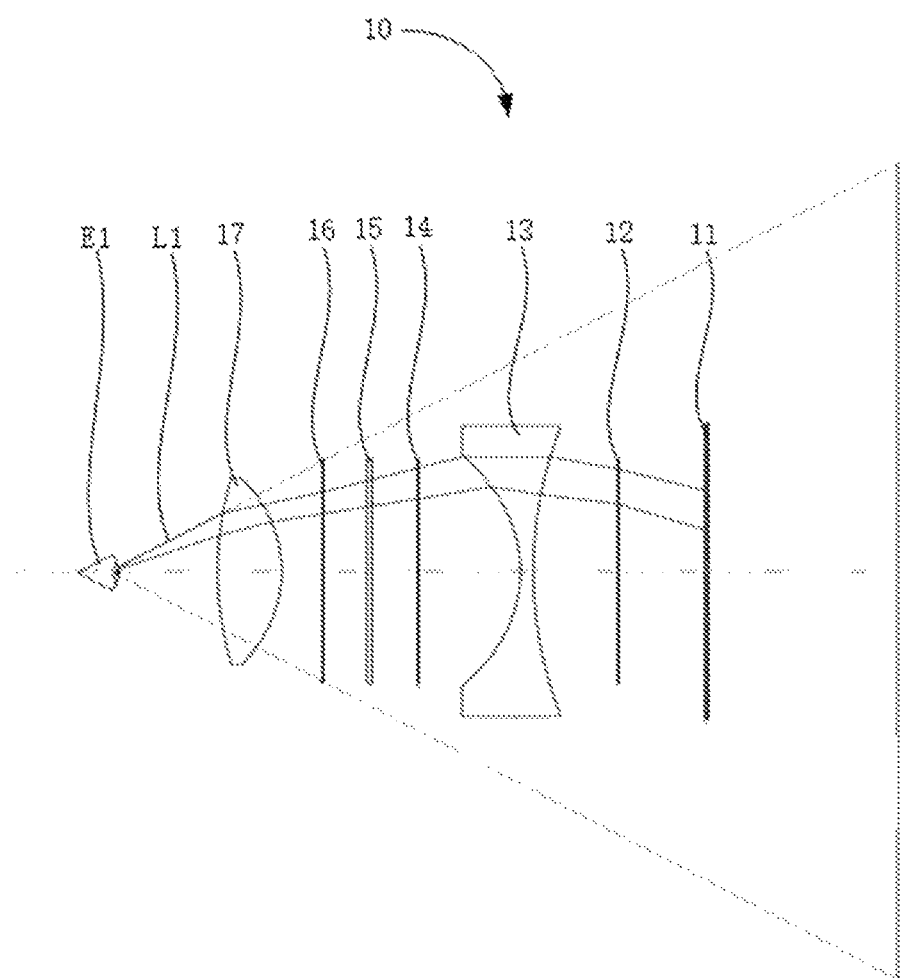
FIG. 1 is a schematic diagram illustrating a light path of a display system in a time division multiplexing solution.

Exemplary embodiments will be described in detail herein, with the examples thereof represented in the drawings. When the following descriptions involve the drawings, similar numerals in different drawings refer to same or similar elements unless otherwise indicated. The implementations described in the following embodiments do not represent all implementations consistent with the present disclosure. Rather, they are merely examples of apparatuses and methods consistent with some aspects of the present disclosure as detailed in the appended claims.

A display system 10 adopting a time division multiplexing solution is briefly described below. As shown in FIG. 1, the display system 10 includes a display panel 11, a circular polarizer 12, a first lens 13, a half lens 14, a variable phase retarder 15, a reflective polarizer 16, a second lens 17, and a controller (not shown). The circular polarizer 12 is located at a light-emitting side of the display panel 11, the first lens 13 is located at a side of the circular polarizer 12 away from the display panel 11, the first lens 13 is located at a side of the circular polarizer 12 away from the display panel 11, the half lens 14 is located at a side of the first lens 13 away from the circular polarizer 12, the variable phase retarder 15 is located at the half lens 14 away from the first lens 13, and the reflective polarizer 16 is located at a side of the variable phase retarder away from the half lens 14. Furthermore, the display panel 11, the circular polarizer 12, the first lens 13, the half lens 14, the variable phase retarder 15, the reflective polarizer 16 and the second lens 17 are on a same optical axis. The variable phase retarder 15 accepts light emitted by the display panel 11 and changes state under the control of the controller to selectively transmit through a polarized light or a second polarized light. The reflective polarizer 16 is located at the light-emitting side of the variable phase retarder 15 and capable of being transmitted through by the first polarized light and reflecting the second polarized light. The controller may be located at any position that does not affect displaying of the display system 10. The controller is configured to control the display panel 11 to perform display function, and control state change of the variable phase retarder 15, where the first lens 13 is a concave lens and the second lens 17 is a convex lens.

FIG. 1 shows the display system 10 displaying a near field (NF) image. As shown in FIG. 1, the variable phase retarder 15 is in a no-phase-difference state. Rays L1 emitted by the display panel 11 sequentially run through the circular polarizer 12, the first lens 13, the half lens 14, the variable phase retarder 15, the reflective polarizer 16 and the second lens 17 into eyes E1 of a user, and form a near field image in the eyes E1 of the user, where the rays L1 emitted by the display panel 11 are changed into a circularly-polarized light after running through the circular polarizer 12, and the rays L1 changed into the circularly-polarized light are transmitted through the half lens 14 in one half and reflected in the other half when running through the half lens 14. Further, when the rays L1 changed into the circularly-polarized light run through the reflective polarizer 16, components of the circularly-polarized light that are in a same direction as a transmission axis of the reflective polarizer 16 are transmitted through the reflective polarizer 16.

Figure 2:
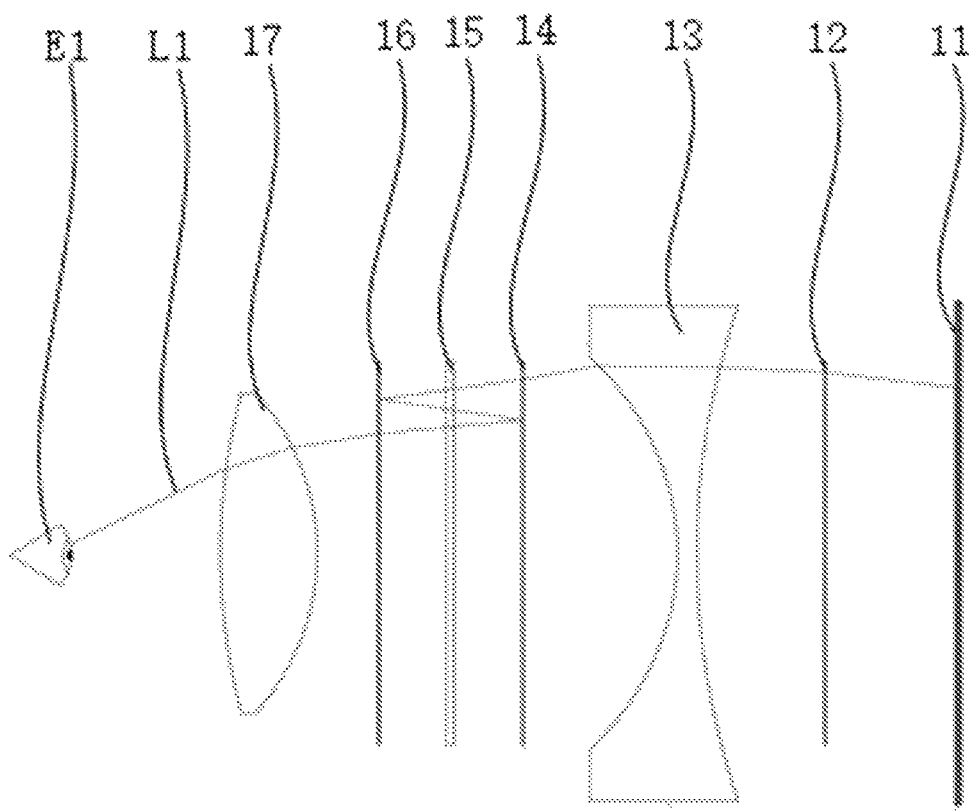
FIG. 2 is a schematic diagram illustrating another light path of a display system in a time division multiplexing solution.

FIG. 2 shows the display system 10 displaying a far field (FF) image. As shown in FIG. 2, the variable phase retarder 15 in a state with a phase difference. Rays L1 emitted by the display panel 11 sequentially run through the circular polarizer 12, the first lens 13, the half lens 14, the variable phase retarder 15, the reflective polarizer 16, the phase retarder 15, the half lens 14, the variable phase retarder 15, the reflective polarizer 16 and the second lens 17 into eyes E1 of a user, and form a far field image in the eyes E1 of the user, where the rays L1 changed into a circularly-polarized light are modulated after running through the variable phase retarder 15 with a phase difference state, and reflected in the reflective polarizer 16. Further, the rays L1 are modulated again after running through the variable phase retarder 15 again. Hence, when the rays L1 run through the reflective polarizer 16 again, the rays L1 can be transmitted through the reflective polarizer 16.

Figure 3:
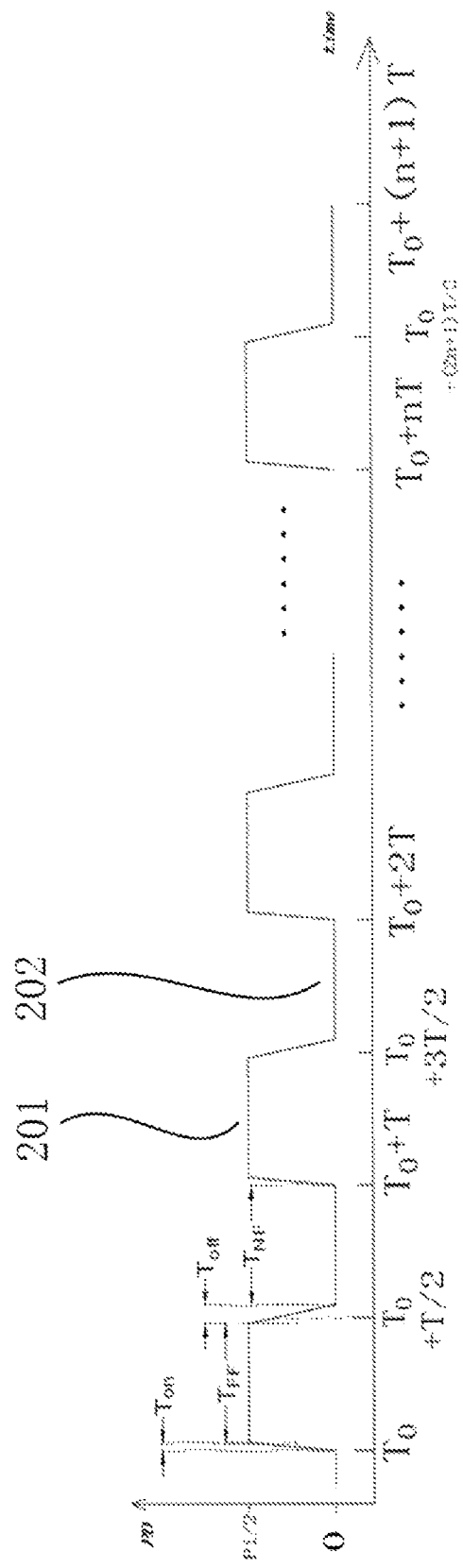
FIG. 3 is a time sequence diagram illustrating image alternating in a display system in a time division multiplexing solution.

FIG. 3 shows a time sequence correspondence between the display system 10 and the phase state change of the variable phase retarder 15. As shown in FIG. 3, the variable phase retarder 15 switches between a fully transparent state 202 without phase difference and a state 201 with phase difference alternately. In this way, the far field image and the near field image can be formed alternately in the eyes E1 of the user. Further, multiple focal planes may be formed by a single display panel 11. It should be noted that the variable phase retarder 15 switching between two display states alternately is only illustrative. In other embodiments, the variable phase retarder 15 may also switch in more than two display states cyclically to form more than two focal images.

Figure 4:
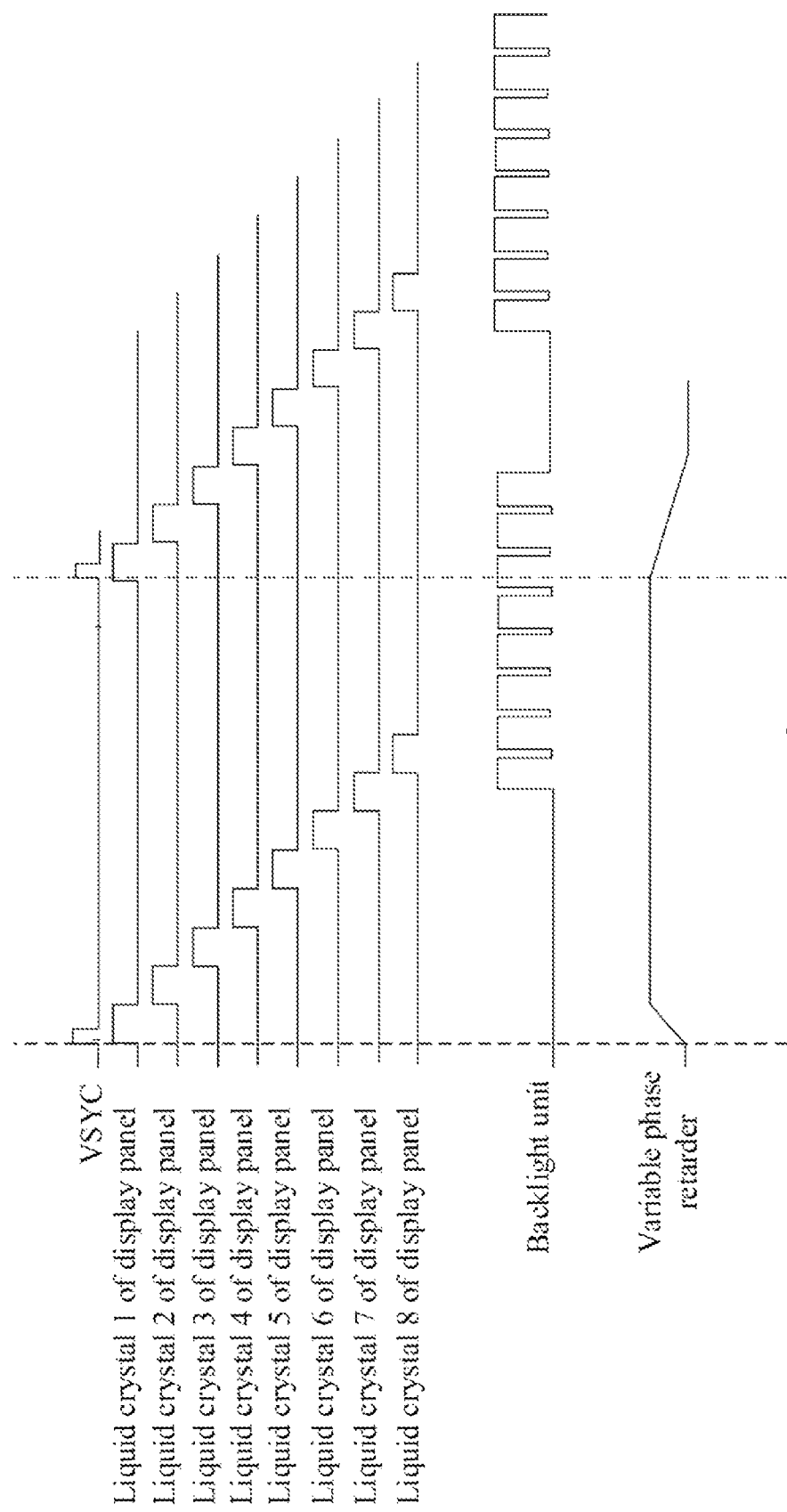
FIG. 4 is a time sequence diagram illustrating a display system in a time division multiplexing solution.

FIG. 4 shows a time sequence correspondence between the display panel 11 and the phase state change of the variable phase retarder 15. The display panel 11 includes liquid crystals and a backlight unit and has a plurality of sub-display regions. Each sub-display region includes a plurality of pixel rows. Specifically, the display panel 11 may include 2880 pixel rows, which is not limited herein. The backlight unit includes a plurality of sub-backlight regions, each sub-backlight region corresponds to one sub-display region, that is, each sub-backlight region corresponds to a plurality of pixel rows. For example, the display panel may include 8 sub-display regions, the backlight unit may include 8 sub-backlight regions, and each sub-backlight region corresponds to 360 pixel rows, which is not limited herein. The sub-backlight regions can be turned on relatively independently to provide backlight to the corresponding sub-display regions, i.e, to a plurality of corresponding pixel rows. The sub-backlight regions can be turned on relatively independently, which means the sub-backlight regions are turned on only to provide backlight to the corresponding sub-display regions rather than to other adjacent sub-display regions. Specifically, the sub-backlight regions may be controlled by the controller of the display panel 11 to turn on relatively independently. Further, the sub-backlight regions may also be controlled by a multiplexer in the sub-backlight regions to turn on relatively independently. As shown in FIG. 4, the display panel 11 may include 2880 pixel rows, and the backlight unit may include 8 sub-backlight regions which can be turned on sequentially. When a 6th sub-backlight region is turned on the variable phase retarder 15 is changing phase state, and at this time, light emitted by the display panel 11 may run through the variable phase retarder 15 being in a state change process, and thus, the display system 10 may have the problem of conflicts of far field image and near field image.

Figure 5:
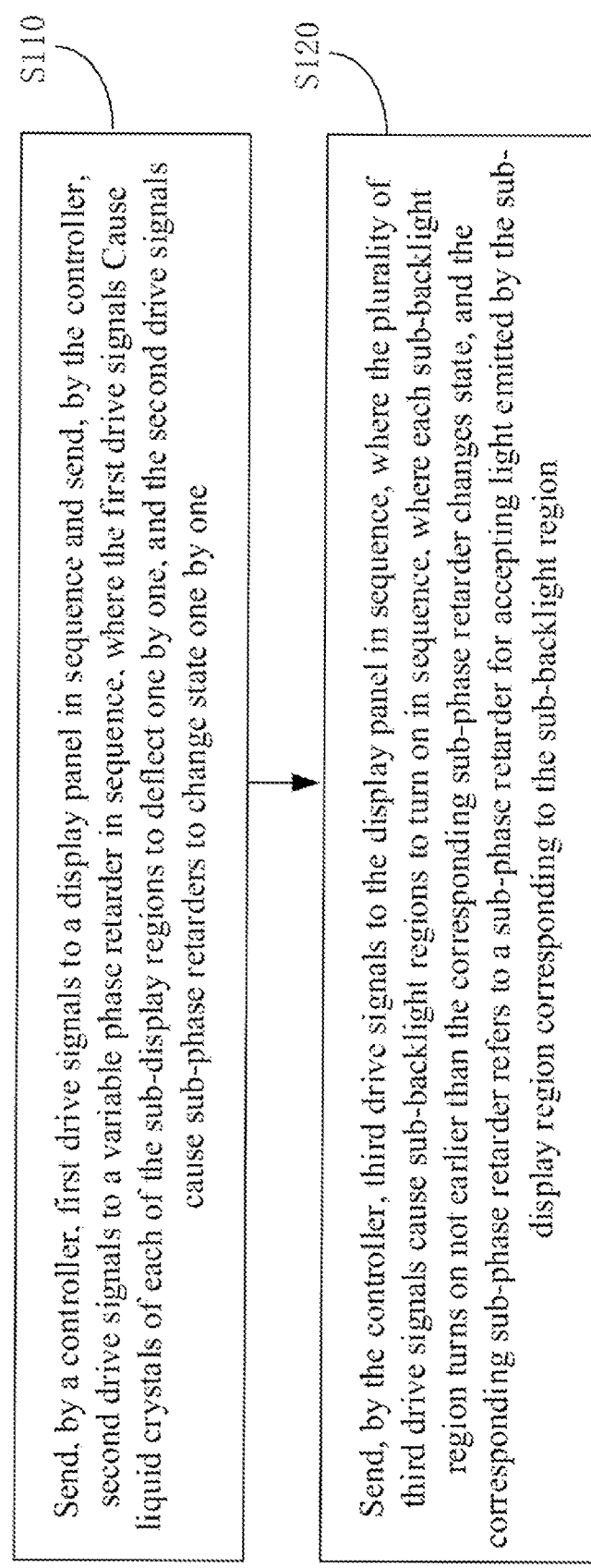
FIG. 5 is a flowchart illustrating a drive method of a display system according to an embodiment of the present disclosure.
Figure 6:
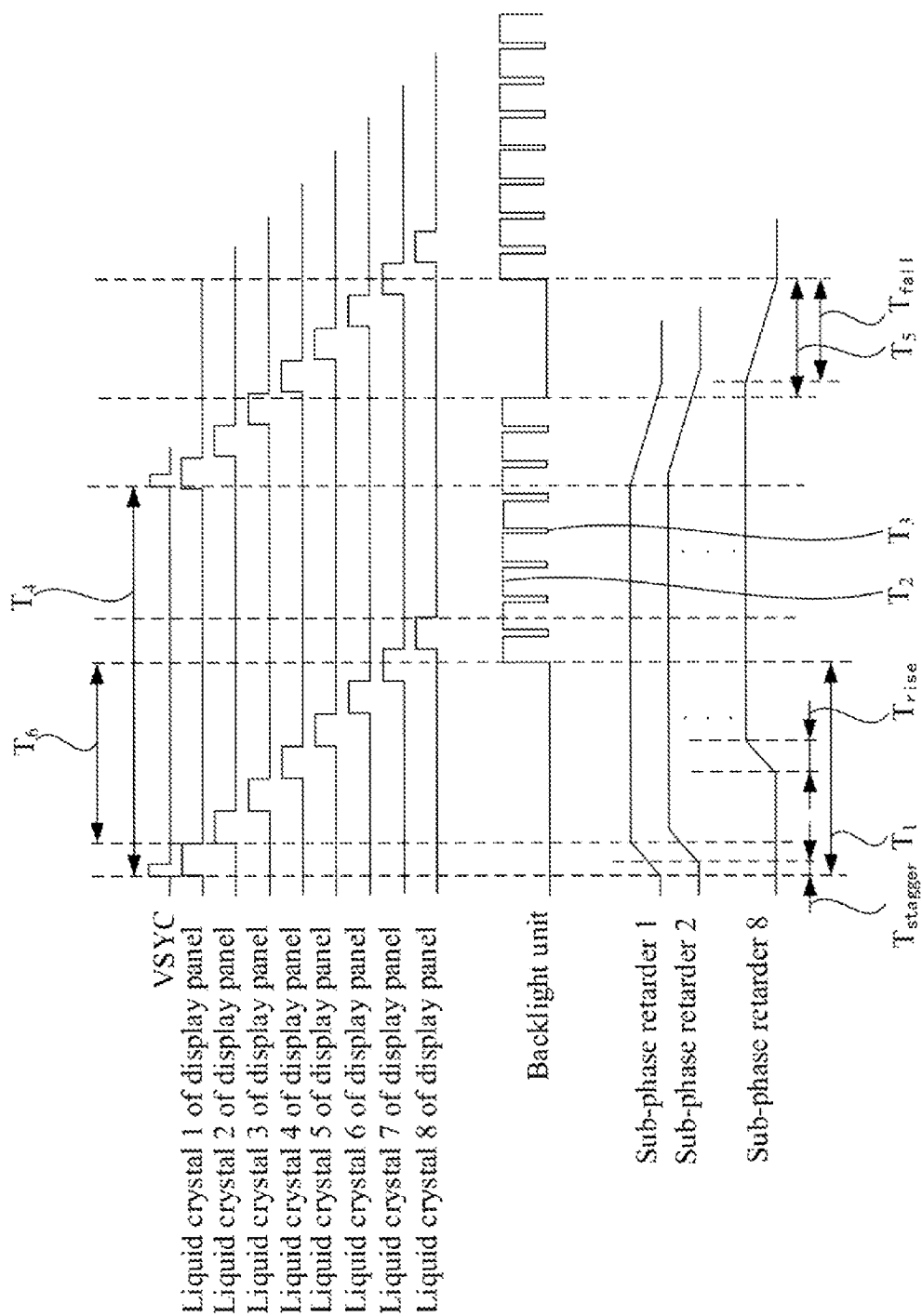
FIG. 6 is a time sequence diagram illustrating a drive method of a display system according to an embodiment of the present disclosure.

In order to improve the problem of image conflicts, the present disclosure provides a drive method of a display system, where the display system may be same as or similar to the display system 10 as shown in FIGS. 1 and 2. FIG. 5 is a flowchart of an embodiment of a drive method of the display system 10 consistent with the inventive idea of the present disclosure. FIG. 6 is a time sequence diagram of state change of the display system 10 consistent with the inventive idea of the present disclosure. As shown in FIGS. 5 and 6, the drive method of the display system 10 includes steps S110 to S120.

At step S110, the controller sends first drive signals to the display panel 11 in sequence and sends second drive signals to the variable phase retarder 15 in sequence, where the first drive signals cause the liquid crystals of each of the sub-display regions to deflect one by one, and the second drive signals cause sub-phase retarders to change state one by one.

At step S120, the controller sends third drive signals to the display panel 11 in sequence, where the third drive signals cause sub-backlight regions to turn on in sequence. Further, each sub-backlight region turns on not earlier than the corresponding sub-phase retarder changes state, where the corresponding sub-phase retarder refers to a sub-phase retarder for accepting light emitted by the sub-display region corresponding to the sub-backlight region.

In the display system 10, the backlight unit of the display panel 11 may be an integral backlight plate, and each of a plurality of sub-backlight regions is a part of the integral backlight plate. Hence, as shown in FIG. 6, one signal output line is used to send a control instruction to all sub-backlight regions of the entire backlight unit to control each sub-backlight region to turn on or off. Further, each sub-backlight region of the display panel 11 may be further configured to turn on relatively independently, that is, when each sub-backlight region is turned on, any other sub-backlight regions are not affected. As in FIG. 6, one group of continuous backlight unit control signals includes a plurality of continuous pulse signals, where each pulse signal corresponds to one sub-backlight region. In this embodiment, the display panel 11 includes 8 sub-display regions, and correspondingly, one group of backlight unit control signals includes 8 pulse signals. A first pulse signal controls a first sub-backlight region, a second pulse signal controls a second sub-backlight region . . . and an eighth pulse signal controls an eighth sub-backlight region. At a high level of each pulse signal, the corresponding sub-backlight region is turned on and kept illuminating. At other times, the corresponding sub-backlight regions are all in an off state. FIG. 6 also illustrates a time sequence of one VSYC, where the VSYC is a frame synchronization signal. Specifically, the signal is a mark signal at the start of each frame, which is used to assist the controller in identifying each frame signal.

In this embodiment, the moment that the sub-backlight regions turn on is not earlier than the moment that the corresponding sub-phase retarders change state, and the sub-phase retarders are sub-phase retarders for accepting the light emitted by the sub-display regions corresponding to the sub-backlight regions. Therefore, it can be guaranteed that, when the sub-backlight regions are turned on, the corresponding sub-phase retarders are not in a flip state. Further, the time sequences of the sub-phase retarders, the sub-backlight regions and the liquid crystals corresponding to the sub-backlight regions can be mutually matched so as to avoid the problem of conflicts of far field image and near field image. Furthermore, by using the plurality of first drive signals, the liquid crystals of the plurality of sub-display regions are controlled to deflect one by one, so as to greatly shorten the time length that the first drive signals sequentially scan all pixel rows of the display panel 11. As a result, the problem that the time length that a single first drive signal sequentially scans all pixel rows of the display panel exceeds a time length of one frame of image can be avoided. In this case, the display panel 11 can achieve high refresh rate in a case of high pixel density while improving the overall image quality displayed by the display system 10.

In some embodiments, a moment that the sub-backlight region turns off is not later than a moment that the corresponding sub-phase retarder changes state again. With the above arrangement, it can be further guaranteed that, when the sub-backlight regions are turned on, the corresponding sub-phase retarders are not in a flip state. Hence, the time sequences of the sub-phase retarders, the sub-backlight regions and the liquid crystals corresponding to the sub-backlight regions can be further mutually matched, so as to avoid the problem of conflicts of far field image and near field image.

In some embodiments, as shown in FIG. 6, a state change of the sub-phase retarders has a rising edge period $T_{rise}$ and a falling edge period $T_{fall}$. The sub-backlight region being on not temporally overlapping the rising edge period $T_{rise}$ and the falling edge period $T_{fall}$ of the corresponding sub-phase retarder. With the above arrangement, it can be further guaranteed that, when the sub-backlight regions are turned on, the corresponding sub-phase retarders are not in a flip state. Thus, the time sequences of the sub-phase retarders, the sub-backlight regions and the liquid crystals corresponding to the sub-backlight regions can be further mutually matched, so as to avoid the problem of conflicts of far field image and near field image.

In some embodiments, the display panel 11 may further include a plurality of multiplexers, each of which is used to control one sub-backlight region to turn on. By disposing the multiplexers to control each sub-backlight region to turn on, the controller can more accurately control the sub-backlight regions to turn on and better avoid mutual interference possibly occurring when the sub-backlight regions are turned on. In this way, the influence of abnormal turning-on of the sub-backlight regions on normal display can be avoided. It should be noted that the display system 10 is not limited to controlling the sub-backlight regions to turn on by using the multiplexers, and in other embodiments, the display panel 11 may also control the sub-backlight regions to turn on by directly using the controller.

In some embodiments, the sub-phase retarders include a liquid crystal wave plate. By flipping the liquid crystal wave plates, the state of the sub-phase retarders can be changed. Specifically, the liquid crystal wave plates may include quarter wave plates. By disposing the sub-phase retarders as quarter liquid crystal wave plates, brightness loss when the rays run through the sub-phase retarders can be avoided.

In some embodiments, during a display process of a same frame of image, sending moments of a first-sent first drive signal and a first-sent second drive signal may be same. Further, it should be noted that the sending moments of the first-sent first drive signal and the first-sent second drive signal may also be different. When the sending moments of the first-sent first drive signal and the first-sent second drive signal are different, before a first pixel row accepts the first-sent first drive signal, the first drive signals may further go through an inspection and debugging time. In the inspection and debugging time, the controller performs inspection and debugging on the first drive signals. Specifically, the display panel 11 may include at least one pixel row not involved in displaying, and in the inspection and debugging time, the first drive signals scan these pixels not involved in displaying. By checking a state of the pixel rows not involved in displaying and scanned by the first drive signals, the controller determines the actual effect of the first drive signals, and hereby performs inspection and debugging on the first drive signals to enable the displaying of the pixel rows scanned by the first drive signals to reach a desired effect. The inspection and debugging time may be $T_{debug}$. In the above arrangement, when the sending moments of the first-sent first drive signal and the first-sent second drive signal are same, the inspection and debugging performed by the controller on the first drive signals can be cancelled so as to further shorten a time length of one frame. Further, a refresh rate of the display panel 11 can be further increased so as to improve the overall image quality displayed by the display system 10. When the sending moments of the first-sent first drive signal and the first-sent second drive signal are different, the controller may perform inspection and debugging on the first drive signals within the inspection and debugging time $T_{debug}$, so as to avoid the influence of the faults of the first drive signals on the display effect of the display panel 11.

In some embodiments, the first-sent first drive signal and the first-sent second drive signal both are sent at an initial moment of starting to display one frame of image. In the above arrangement, the time length of one frame can be further shortened, and the refresh rate of the display panel 11 can be further improved. Hence, the display quality of the display system 10 can be improved. But, in other embodiments, the first-sent first drive signal and the first-sent second drive signal are not limited to being sent at the initial moment of stating to display one image, that is, the first-sent first drive signal and the first-sent second drive signal may also be sent at other times than the initial moment of starting to display one frame of image.

In some embodiments, as shown in FIG. 6, in the drive method of the display system 10, in the plurality of sent second drive signals, a time interval between two adjacent second drive signals is an staggered time length $T_{stagger}$, and $T_{stagger}$ is not greater than a maximum staggered time length $T_{max.stagger}$ and not less than a minimum staggered time length $T_{min.stagger}$. Specifically, the maximum staggered time length and the minimum staggered time length comply with the following formulas:

the maximum staggered time length $T_{max.stagger} = T_1/(A-1)$;

the minimum staggered time length $T_{min.stagger} = [A*T_2+(A-1)*T_3-T_4+T_1]/(A-1)$.

In the above formulas, A is a number of a number of the sub-phase retarders: $T_1$ is a time interval between an initial moment of one frame of image and the moment of sending a first-sent third drive signal: $T_2$ is a time length in which one sub-backlight region keeps illuminating: $T_3$ is a time interval between a moment that a previous sub-backlight region ends illuminating and a moment that a next sub-backlight region starts illuminating: $T_4$ is a time length in which the display panel 11 displays one frame of image. In the above arrangement, the variable phase retarder 15 and the display panel 11 can be mutually matched in time sequence. $T_{stagger}$ being not greater than the maximum staggered time length can ensure that all sub-phase retarders complete state change of rising edge before the first sub-backlight region within the frame is turned on, and $T_{stagger}$ being not less than the minimum staggered time length can ensure that, only after the A-th sub-backlight region ends illuminating, the corresponding sub-phase retarder starts performing state change of falling edge. The problem that the variable phase retarder 15 is performing state change when the display region is turned on can be further avoided, and furthermore, the problem of conflict of far field image and near field image can be further avoided.

In some embodiments, $T_1$, $T_2$ and $T_4$ satisfy preset light field conditions. Specifically, the preset light field condition requires the following formulas:

$$T_5 + A*T_3 + A*T_2 = T_4;$$

$$1/A * Hadr * T_{scan} \leq T_2 \leq 1/A * T_4;$$

$$1/A * (Hadr + T_{debug}) * T_{scan} + T_6 \leq T_1 \leq T_4 - T_2;$$

As shown in FIG. 6, $T_5$ is a time length between a moment that the last sub-backlight region ends illuminating when the display panel 11 displays a previous frame of image and a moment that the first sub-backlight region is turned on when the display panel 11 displays a next frame of image. As in the above formulas, Hadr represents a number of pixel rows in the display panel 11. $T_{scan}$ is a time length required by the first drive signals to scan each pixel row in the display panel 11. $T_{debug}$ is a time length between a moment that the first drive signals are sent and a moment that the first sub-display region in the display panel 11 accepts the first drive signals, and $T_6$ is a time length in which the first drive signals control the liquid crystals in the first sub-display region to flip. With the above arrangement, it can be guaranteed that the liquid crystal flip of the sub-display regions and the time sequence of the sub-backlight regions can be mutually matched so as to avoid the problem of black and white screen of the display panel 11 caused by poor matching of the liquid crystals of the sub-display regions and the time sequence of the sub-backlight regions. It should be noted that the above $T_1$, $T_2$ and $T_4$ satisfying the preset light field conditions are merely illustrative, and in other embodiments, the parameters of the display system 10 may also satisfy other preset light field conditions to ensure the time sequence of the liquid crystal flip of the sub-display regions and the time sequence of the sub-backlight regions are mutually matched.

In some embodiments, $T_3$, $T_5$ and $T_{debug}$ are all zero. In this arrangement, $T_3$, $T_5$ and $T_{debug}$ can all be shortened to a minimum, so as to shorten the time length Ta that the display panel 11 displays one frame of image. In this way, the refresh rate of the display system 10 can be further increased, and the overall image quality that the display system 10 displays can be improved. It is to be noted that in other embodiments, $T_3$, $T_5$ and $T_{debug}$ may also be other times in which the liquid crystals of the sub-display regions and the time sequences of the sub-backlight regions and the sub-phase retarders are mutually matched.

In some embodiments, the display panel 11 includes 8 sub-backlight regions. Corresponding to 8 sub-backlight regions. 8 multiplexers. 8 sub-phase retarders and 8 sub-display regions are disposed. The display panel 11 may have a resolution of 2880*2880) corresponding to a total of 2880 pixel rows, that is. Hadr may be 2880 rows. The display panel 11 may have a pixel density of 1200 ppi, the time length $T_{scan}$ required to scan each pixel row may be 0.0027 milliseconds, the time length $T_4$ of one frame of image may be 11.11 milliseconds, the time length $T_6$ required to control the liquid crystals in the sub-display regions to flip may be 4.5 milliseconds, the time interval T1 between the initial moment of one frame of image and the moment of sending the first-sent third drive signal may be 5.472 milliseconds, the time length $T_2$ in which one sub-backlight region keeps illuminating may be 1 millisecond, the time length $T_5$ between the moment that the last sub-backlight region ends illuminating when the display panel 11 displays a previous frame of image and the moment that the first sub-backlight region is turned on when the display panel 11 displays a next frame of image may be 2.094 milliseconds, the time interval $T_3$ between the moment that a previous sub-backlight region ends illuminating and the moment a next sub-backlight region starts illuminating may be 0.127 milliseconds, and the staggered time length $T_{stagger}$ may be 0.4644 milliseconds. With this arrangement, it is ensured that, when the display region is turned on in a case of the pixel density of the display panel 11 being 1200, the resolution being 2880*2880 and the number of the multiplexers being 8, each sub-phase retarder does not perform state change. Hence, the problem that the sub-phase retarders 15 are performing state change when the display region is turned on can be avoided, and further the problem of conflict of far field image and near field image can be avoided. It should be noted that, the above parameters are only illustrative, and in other embodiments, the above parameters may be other parameters satisfying the requirements.

It is noted that the above drive method of the present disclosure is not limited to the display system 10 shown in FIGS. 1 and 2. The above drive method may also be applied to other types of single-screen multi-focal-plane display system. For example, in the display system shown in FIGS. 1 and 2, the circular polarizer 12, the first lens 13, the half lens 14, the reflective polarizer 16 and the second lens 17 are all used to cooperate with the variable phase retarder 15 to achieve single-screen and double-focal-plane display. It is easily understood that the circular polarizer 12, the first lens 13, the half lens 14, the reflective polarizer 16 and the second lens 17 and the like can be replaced with other optical path structures as long as such structures can cooperate with the variable phase retarder 15 to achieve single-screen and multi-focal-plane display.

An embodiment of the present disclosure further provides a display system 10. As shown in FIGS. 1 and 2, the display system 10 includes a controller (not shown), a display panel 11, and a variable phase retarder 15.

The display panel 11 includes liquid crystals and a backlight unit and has a plurality of sub-display regions. Each sub-display region includes a plurality of pixel rows. The backlight unit has a plurality of sub-backlight regions, and each sub-backlight region corresponds to one sub-display region. The sub-backlight regions are configured to turn on relatively independently to provide backlight to the corresponding sub-display regions. The variable phase retarder 15 accepts light emitted by the display panel and changes state under the control of the controller to selectively transmit a first polarized light or a second polarized light. The variable phase retarder 15 includes a plurality of sub-phase retarders, and each sub-phase retarder corresponds to one sub-display region and is configured to accept light emitted by the corresponding sub-display region.

The controller is configured to automatically perform the following operations to achieve image display:

sending, by the controller, a plurality of first drive signals to the display panel 11 in sequence and sending, by the controller, a plurality of second drive signals to the variable phase retarder 15 in sequence, where the plurality of first drive signals are used to control the liquid crystals of the plurality of sub-display regions to deflect one by one, and the plurality of second drive signals are used to control the plurality of sub-phase retarders to change state one by one:

sending, by the controller, a plurality of third drive signals to the display panel 11 in sequence, where the plurality of third drive signals are used to control the plurality of sub-backlight regions to turn on in sequence, and a moment that each sub-backlight region turns on is not earlier than a moment that the corresponding sub-phase retarder changes state, where the corresponding sub-phase retarder refers to a sub-phase retarder for accepting light emitted by the sub-display region corresponding to the sub-backlight region.

In the above embodiments, since the moment that the sub-backlight regions turn on is not earlier than the moment that the corresponding sub-phase retarders change state, it can be guaranteed that the corresponding sub-phase retarders are not in flip state when the sub-backlight regions turn on. Hence, the time sequences of the sub-phase retarders, the sub-backlight regions and the liquid crystals corresponding to the sub-backlight regions can be mutually matched so as to avoid the problem of conflicts of far field image and near field image. Furthermore, by using a plurality of first drive signals, the liquid crystal of a plurality of sub-display regions are controlled to deflect one by one, so as to greatly shorten the time length that the first drive signals sequentially scan all pixel rows of the display panel 11. As a result, the problem that the time length that a single first drive signal sequentially scans all pixel rows of the display panel 11 exceeds a time length of one frame of image can be avoided. In this case, the display panel 11 can achieve high refresh rate in a case of high pixel density while improving the overall image quality displayed by the display system 10.

In some embodiments, a moment that the sub-backlight region turns off is not later than a moment that the corresponding sub-phase retarder changes state again. With the above arrangement, it can be further guaranteed that, when the sub-backlight regions are turned on, the corresponding sub-phase retarders are not in a flip state. Hence, the time sequences of the sub-phase retarders, the sub-backlight regions and the liquid crystals corresponding to the sub-backlight regions can be further mutually matched, so as to avoid the problem of conflicts of far field image and near field image.

In some embodiments, the sub-phase retarders have a rising edge period $T_{rise}$ and a falling edge period $T_{fall}$ during state change. There is no overlapping time period between a time period in which the sub-backlight region turns on and keep illuminating and both the rising edge period $T_{rise}$ and the falling edge period $T_{fall}$ of the corresponding sub-phase retarder. With the above arrangement, it can be further guaranteed that, when the sub-backlight regions are turned on the corresponding sub-phase retarders are not in a flip state. Thus, the time sequences of the sub-phase retarders, the sub-backlight regions and the liquid crystals corresponding to the sub-backlight regions can be further mutually matched, so as to avoid the problem of conflicts of far field image and near field image.

In some embodiments, the backlight unit may be implemented by Mini-LED. The display panel 11 may further include a plurality of multiplexers, each of which is used to control one sub-backlight region to turn on. By disposing the multiplexers to control each sub-backlight region to turn on, the controller can more accurately control the sub-backlight regions to turn on and better avoid mutual interference possibly occurring when the sub-backlight regions are turned on. In this way, the influence of abnormal turning-on of the sub-backlight regions on normal display can be avoided. It should be noted that the display system 10 is not limited to controlling the sub-backlight regions to turn on by using the multiplexers, and in other embodiments, the display panel 11 may also control the sub-backlight regions to turn on by directly using the controller.

In some embodiments, the sub-phase retarders include a liquid crystal wave plate. By flipping the liquid crystal wave plates, the state of the sub-phase retarders can be changed. Specifically, the liquid crystal wave plates may include quarter wave plates. By disposing the sub-phase retarders as quarter liquid crystal wave plates, brightness loss when the rays run through the sub-phase retarders can be avoided.

In some embodiments, during a display process of a same frame of image, sending moments of a first-sent first drive signal and a first-sent second drive signal may be same. Further, it should be noted that the sending moments of the first-sent first drive signal and the first-sent second drive signal may also be different. When the sending moments of the first-sent first drive signal and the first-sent second drive signal are different, before a first pixel row accepts the first-sent first drive signal, the first drive signals may further go through an inspection and debugging time. In the inspection and debugging time, the controller performs inspection and debugging on the first drive signals. Specifically, the display panel 11 may include at least one pixel row not involved in displaying, and in the inspection and debugging time, the first drive signals scan these pixels not involved in displaying. By checking a state of the pixel rows not involved in displaying but scanned by the first drive signals, the controller determines the actual effect of the first drive signals, and hereby performs inspection and debugging on the first drive signals to enable the displaying of the pixel rows scanned by the first drive signals to reach a desired effect. The inspection and debugging time may be $T_{debug}$. In the above arrangement, when the sending moments of the first-sent first drive signal and the first-sent second drive signal are same, the inspection and debugging performed by the controller on the first drive signals can be cancelled so as to further shorten a time length of one frame. Further, a refresh rate of the display panel 11 can be further increased so as to improve the overall image quality displayed by the display system 10. When the sending moments of the first-sent first drive signal and the first-sent second drive signal are different, the controller may perform inspection and debugging on the first drive signals within the inspection and debugging time $T_{debug}$, so as to avoid the influence of the faults of the first drive signals on the display effect of the display panel 11.

In some embodiments, the first-sent first drive signal and the first-sent second drive signal both are sent at an initial moment of starting to display one frame of image. In the above arrangement, the time length of each frame can be further shortened, and the refresh rate of the display panel 11 can be further improved. Hence, the display quality of the display system 10 can be improved. But, in other embodiments, the first-sent first drive signal and the first-sent second drive signal are not limited to being sent at the initial moment of stating to display one image, that is, the first-sent first drive signal and the first-sent second drive signal may also be sent at other times than the initial moment of starting to display one frame of image.

An embodiment of the present disclosure further provides an electronic device which includes the display system 10 described in any one of the above embodiments.

In some embodiments, the electronic device may be a virtual reality device. Specifically, the electronic device may be a wearable virtual reality device, for example, the electronic device may be VR glasses or VR helmet or the like. Therefore, the electronic device may further include a wearable component in addition to the above display system 10.

The above embodiments of the present disclosure may be mutually supplemented in case of no conflicts.

It should be noted that in the accompanying drawings, for illustration clarity, the sizes of the layers and regions may be exaggerated. Furthermore, it may be understood that when an element or layer is referred to as being "on" another element or layer, such element or layer may be directly on the other element or layer or there is an intermediate layer therebetween. Further, it is understood that when an element or layer is referred to as being "under" another element or layer, such element or layer may be directly under the other element or layer, or one or more intermediate elements or layers are present therebetween. In addition, it may also be understood that when a layer or element is referred to as being "between" two layers or elements, such layer or element may be a sole layer between the two layers or elements, or one or more intermediate layers or elements are present. Similar reference signs in the descriptions indicate similar elements.

The term "a plurality of" refers to two or more unless otherwise clearly stated.

Other implementations of the present disclosure will be apparent to those skilled in the art from consideration of the specification and practice of the present disclosure herein. The present disclosure is intended to cover any variations, uses, modification or adaptations of the present disclosure that follow the general principles thereof and include common knowledge or conventional technical means in the related art that are not disclosed in the present disclosure. The specification and examples are considered as exemplary only, with a true scope and spirit of the present disclosure being indicated by the following claims.

It is to be understood that the present disclosure is not limited to the precise structure described above and shown in the accompanying drawings, and that various modifications and changes may be made without departing from the scope thereof. The scope of the present disclosure is limited only by the appended claims.

The invention claimed is:

1. A drive method of a display system,
wherein the display system comprises a controller, a display panel and a variable phase retarder; wherein the display panel comprises liquid crystals and a backlight unit and has sub-display regions; wherein each of the sub-display regions comprises pixel rows; wherein the backlight unit has sub-backlight regions; wherein each of the sub-backlight regions corresponds to one of the sub-display regions, and the sub-backlight regions are configured to turn on independently to provide backlight to the corresponding sub-display regions; wherein the variable phase retarder accepts light emitted by the display panel and changes state controlled by the controller to selectively transmit a first polarized light or a second polarized light; wherein the variable phase retarder comprises sub-phase retarders, and each of the sub-phase retarders corresponds to and is configured to accept light emitted by one of the sub-display regions;
wherein the drive method comprises:
sending, by the controller, first drive signals to the display panel in sequence and sending, by the controller, second drive signals to the variable phase retarder in sequence, wherein the first drive signals cause the liquid crystals of each of the sub-display regions to deflect one by one, and the second drive signals cause the sub-phase retarders to change state one by one; and
sending, by the controller, third drive signals to the display panel in sequence, wherein the third drive signals cause the sub-backlight regions to turn on in sequence, and wherein each sub-backlight region turns on not earlier than the corresponding sub-phase retarder changes state, wherein the corresponding sub-phase retarder refers to a sub-phase retarder for accepting light emitted by the sub-display region corresponding to the sub-backlight region.

2. The drive method of claim 1, wherein each of the sub-backlight regions turns off not later than the corresponding sub-phase retarder changes state again.

3. The drive method of claim 1, wherein a state change of the sub-phase retarders has a rising edge period and a falling edge period, and the sub-backlight region being on not temporally overlapping the rising edge period and the falling edge period of the corresponding sub-phase retarder.

4. The drive method of claim 1, wherein, during a display process of one frame of image, a first of the first drive signals and a first of the second drive signals are sent simultaneously.

5. The drive method of claim 4, wherein, the first of the first drive signals and the first of the second drive signals both are sent at an initial moment of starting to display one frame of image.

6. The drive method of claim 1, wherein, in the second drive signals, a time interval between two adjacent second drive signals is an staggered time length $T_{stagger}$, and $T_{stagger}$ is not greater than a maximum staggered time length $T_{max.stagger}$ and not less than a minimum staggered time length $T_{min.stagger}$;
wherein the maximum staggered time length $T_{max.stagger}=T_1/(A-1)$;
wherein the minimum staggered time length $T_{min.stagger}=[A*T_2+(A-1)*T_3-T_4+T_1]/(A-1)$;
wherein $T_1$ represents a time interval between an initial moment of one frame of image and a moment of sending a first of the third drive signals;
wherein A represents to a number of the sub-phase retarders;
wherein $T_2$ represents a time length in which one sub-backlight region keeps illuminating;
wherein $T_3$ represents a time interval between a moment that a previous sub-backlight region ends illuminating and a moment that a next sub-backlight region starts illuminating;
wherein $T_4$ represents a time length in which the display panel displays one frame of image.

7. The drive method of claim 6, wherein the display panel comprises 8 sub-backlight regions having a total of 2880 pixel rows, a time required to scan each pixel row is 0.0027 milliseconds, the time length $T_4$ of one frame of image is 11.11 milliseconds, $T_1$ is 5.472 milliseconds, $T_2$ is one millisecond, $T_5$ is 2.094 milliseconds, $T_3$ is 0.127 milliseconds, and $T_{stagger}$ is 0.4644 milliseconds.

8. The drive method of claim 1, wherein the display system is configured to perform at least two display states alternately;
wherein, in a first display state, the variable phase retarder allows the first polarized light to be transmitted through, and the display system displays an image of a first focal plane; wherein in a second display state, the variable phase retarder allows the second polarized light to be transmitted through, and the display system displays an image of a second focal plane.

9. The drive method of claim 8, wherein the display system further comprises a reflective polarizer located at a light-emitting side of the variable phase retarder and configured to transmit the first polarized light and reflect the second polarized light;
in the first display state, the first polarized light transmitted through the variable phase retarder is transmitted through the reflective polarizer to form the image of the first focal plane; in the second display state, the second polarized light transmitted through the variable phase retarder is reflected between the reflective polarizer and the variable phase retarder, and after being converted into the first polarized light, is transmitted through the reflective polarizer to form the image of the second focal plane.

10. The drive method of claim 1, wherein the sub-phase retarders comprise quarter liquid-crystal wave plates.

11. A display system, comprising a controller, a display panel and a variable phase retarder; wherein,
the display panel comprises liquid crystals and a backlight unit and has sub-display regions;
wherein each of the sub-display regions comprises pixel rows; wherein the backlight unit has sub-backlight regions; wherein each of the sub-backlight regions corresponds to one of the sub-display regions, and the sub-backlight regions are configured to turn on independently to provide backlight to the corresponding sub-display regions; wherein the variable phase retarder accepts light emitted by the display panel and changes state controlled by the controller to selectively transmit a first polarized light or a second polarized light; wherein the variable phase retarder comprises sub-phase retarders, and each of the sub-phase retarders corresponds to and is configured to accept light emitted by one of the sub-display regions;
wherein the controller is configured to automatically perform the following operations, the operations comprise:
sending, by the controller, first drive signals to the display panel in sequence and sending, by the controller, second drive signals to the variable phase retarder in sequence, wherein the first drive signals cause the liquid crystals of each of the sub-display regions to deflect one by one, and the second drive signals cause the sub-phase retarders to change state one by one; and
sending, by the controller, third drive signals to the display panel in sequence, wherein the third drive signals cause the sub-backlight regions to turn on in sequence, and wherein each sub-backlight region turns on not earlier than the corresponding sub-phase retarder changes state, wherein the corresponding sub-phase retarder refers to a sub-phase retarder for accepting light emitted by the sub-display region corresponding to the sub-backlight region.

12. The display system of claim 11, wherein each of the sub-backlight regions turns off not later than the corresponding sub-phase retarder changes state again.

13. The display system of claim 11, wherein a state change of the sub-phase retarders has a rising edge period and a falling edge period, and the sub-backlight region being on not temporally overlapping the rising edge period and the falling edge period of the corresponding sub-phase retarder.

14. The display system of claim 11, wherein the sub-phase retarders comprise quarter wave plates.

15. The display system of claim 11, wherein, during a display process of one frame of image, a first of the first drive signals and a first of the second drive signals are sent simultaneously.

16. The display system of claim 15, wherein, the first of the first drive signals and the first of the second drive signals both are sent at an initial moment of starting to display one frame of image.

17. An electronic device, comprising the display system of claim 11.

18. The electronic device of claim 17, wherein the electronic device is a virtual reality device.

* * * * *